(12) United States Patent
Ontiveros et al.

(10) Patent No.: US 6,335,681 B1
(45) Date of Patent: Jan. 1, 2002

(54) CRUISE CONTROL ALERT

(76) Inventors: Teofilo Ontiveros, 301 W. Grant, Onarga, IL (US) 60955; Ruben Ontiveros, 123 N. Thomas, Gilman, IL (US) 60938

( * ) Notice: Subject to any disclaimer, the term of this patent is extended or adjusted under 35 U.S.C. 154(b) by 0 days.

(21) Appl. No.: 09/778,834

(22) Filed: Feb. 8, 2001

(51) Int. Cl.[7] .................................................. B60Q 1/54
(52) U.S. Cl. ...................... 340/466; 340/457; 340/472; 340/691.6
(58) Field of Search ................................. 340/463–468, 340/470–472, 457, 691.6

(56) References Cited

U.S. PATENT DOCUMENTS

| | | | |
|---|---|---|---|
| 3,949,361 A | 4/1976 | Replogle | 340/66 |
| 4,236,479 A | 12/1980 | Walker et al. | 116/28 R |
| 5,164,701 A | 11/1992 | Nan-Mu et al. | 340/464 |
| 5,410,294 A | 4/1995 | Gold | 340/464 |
| 5,486,808 A * | 1/1996 | Nejdl | 340/464 |
| 5,500,638 A | 3/1996 | George | 340/468 |
| 5,656,992 A * | 8/1997 | McNeill | 340/466 |
| 5,663,706 A * | 9/1997 | Francis | 340/464 |

* cited by examiner

*Primary Examiner*—Daniel J. Wu
(74) *Attorney, Agent, or Firm*—Patent & Trademark Services; Thomas Zack; Joseph H. McGlynn

(57) ABSTRACT

A cruise control alert system that both visually alerts drivers in other vehicles that a cruise control is operating and the specific speed the cruise control is set. A voice chip within the vehicle informs the driver to set the cruise control at a given preset speed to prevent speeding. The display may be operator controlled or may be tied in to the cruise control to automatically display the notice the cruise control is operating and the speed at which set.

5 Claims, 3 Drawing Sheets

CRUISE CONTROL ALERT

BACKGROUND OF THE INVENTION

This invention relates to a cruise control system that can both alert other drivers in other vehicles that the cruise control is operating in a given vehicle and which may also inform the particular driver to activate or deactivate the cruise control in their vehicle.

Cruise control used in vehicles has proven itself to be of benefit especially when traveling on interstate highways. Normally, a diver first activates the cruise control and, when a desired speed is attained, then engages the control to maintain the vehicle at the engaged speed. This allows the vehicle to operate at a constant speed regardless of changing terrain conditions. Such cruise controls used in vehicles are common and no further comment on their use or benefits is believed necessary.

A problem encountered by users of cruise control is that other drivers are unaware you are operating with the cruise control engaged. Since the acceleration and de acceleration is being controlled to insure a constant speed is maintained, it may appear to other drivers who are unaware you are in cruise control that you are driving in an erratic manner. This can result in such drivers becoming irritated and giving obscene gestures to you. Worse, this same drivers could cause you to be involved in a road rage situation with violent or lethal consequences.

To help decrease the likelihood of road rage and other undesired situations, it is proposed that other drivers be visually alerted that you are in a cruise control mode and that you are traveling at a constant speed indicated. To assist the driver in determining when to turn the cruise control on, a voice chip would alert the drivers when a given predetermined speed is attained at which time the driver may or may not turn on and engage the cruise control.

Vehicle signal systems which alert a driver to perform certain action to control the vehicle are known. For example, in one earlier invention a signal system is disclosed that gives an early warning of braking or accelerating to a following vehicle. In another earlier invention, a device is disclosed which reminds a driver to turn off their headlights.

Another prior art system warns oncoming and following cars about the driving and operating conditions of the driven car.

One other system discloses an auto rear window light that flashes when the cruise control is activated within the same vehicle.

Still another system discloses a system of LED's which sends a message to the operator of a following car.

DESCRIPTION OF THE PRIOR ART

Systems or devices which send alerting signals to the driver of vehicle and to other adjacent vehicles that certain conditions are present are disclosed in the known in the prior art. For example, U.S. Pat. No. 3,949,361 to Replogle a signal system is disclosed that gives an early warning of braking or accelerating to a following vehicle.

U.S. Pat. No. 4,236,479 to Walker et al. discloses a device which reminds a driver to turn off their headlights.

U.S. Pat. No. 5,164,701 to Nan-Mu et al. discloses a system which warns oncoming and following cars about the driving and operating conditions of the driven car.

U.S. Pat. No. 5,410,294 to Gold discloses an auto rear window light that flashes when the cruise control is activated within the same vehicle.

U.S. Pat. No. 5,500,638 to George discloses a system of LED's which sends a message to the operator of a following car.

In the present invention adjacent vehicles are alerted that the cruise control is operating and that it is set at a displayed speed and additionally, a voice chip within the vehicle alerts the driver to activate the cruise control when a predetermined speed is attained all as will be detailed in the specification that follows hereafter.

SUMMARY OF THE INVENTION

This invention relates to a cruise control alert system that both alerts adjacent drivers that the cruise control is operating and set at a given speed and also alerts the driver to engage the cruise control when a predetermined speed is attained.

It is the primary object of the present invention to provide for an improved cruise control alert system which both alerts the driver to turn on the cruise control and also informs adjacent drivers that the cruise control is operating and the speed at which it is set.

Another object is to provide for such a system in which a voice chip alerts the driver to engage the cruise control at a certain predetermined speed to prevent speeding.

These and other objects and advantages of the present invention will become apparent to readers from a consideration of the ensuing description and the accompanying drawings.

DESCRIPTION OF THE PREFERRED EMBODIMENT

Figure 1:
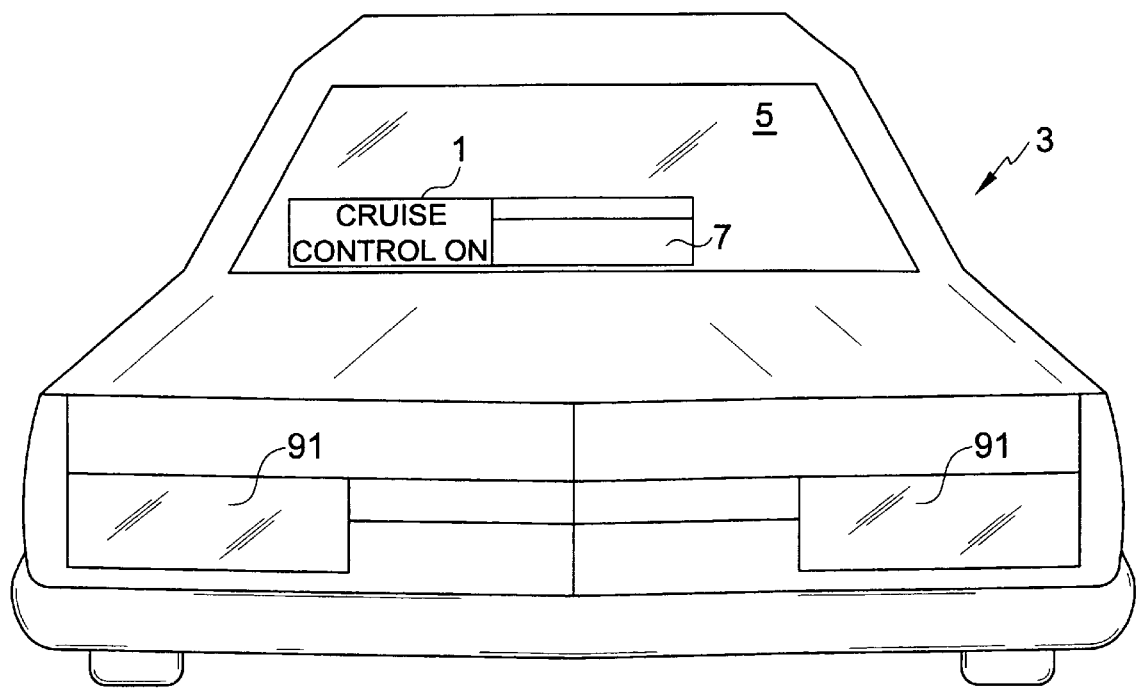
FIG. 1 is a perspective view of the present invention showing one embodiment for the placement of the cruise control alert display.

FIG. 1 is a perspective view of the present invention showing one embodiment for the placement of the cruise control alert display 1. In this embodiment a conventional vehicle 3, like a four door sedan, has the display mount within the vehicle on the lower portion of the rear view window 5. Next to the display is the conventional third rear tail light 7 which is activated when the driver depresses the vehicle's brake pedal. Also shown are the two lower brake tail lights 9 which are activated in unison with the upper light 7. As best shown in the next figure, the visual display 1 is composed of two portions with the illuminated portion displaying the notice that the cruise control is on and operating while the lower illuminated portion, tells a following vehicle operate the exact speed the cruise control is set at their letting them know to pass if they wish to go faster, maintain speed if they agree with the set speed or slow down if this set speed is to high for their driving.

The display can be operated with or totally independent of the cruise control system on the vehicle. If used independently, the display may be switched on or off by the driver as desired and uses the vehicle's battery power to illuminate a light source in the display. The speed displayed can be manually changed to any desired speed which is usually the same at which the driver sets the cruise control. When used to operate in unison with the cruise control, the display is automatically turned on or off with the the cruise control and illuminated from a light source which uses the same power source used to supply power to operate the cruise control. The displayed speed at which the vehicle's cruise control is operating is the same at which the operator sets the cruise control system and changes along with the setting.

Figure 2:
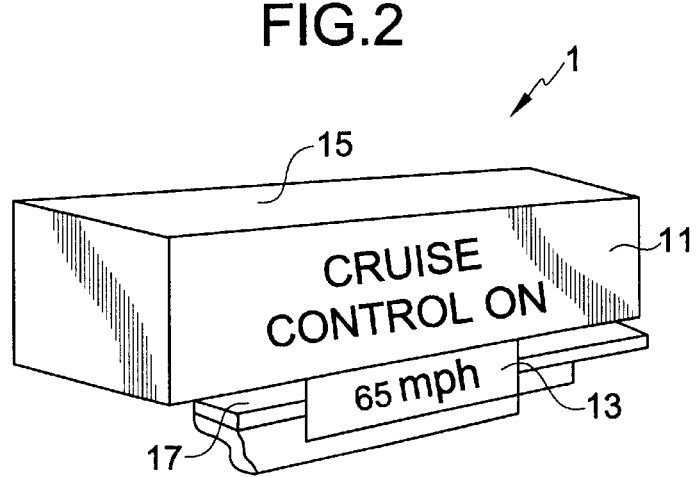
FIG. 2 is an enlarged perspective view of the display shown in FIG. 1.

FIG. 2 is an enlarged perspective view of the display 1 shown in FIG. 1. Both the upper portion 11 having the notice that the cruise control is on and the lower portion 13 shown the miles per hour (mph) the cruise is set at have internal light sources (not shown) which provide illumination to make the display visible under low or no light conditions. As stated before, this display may be independently operated from the vehicles conventional cruise control system or may be wired to be dependent thereon and operate automatically in unison with the cruise control. Normally, the displays 11 and 13 have planar lens surfaces which display the letters or numbers. Conventional bulbs or light emitting diodes may be used for the electrically operated illuminating source and are retained in the mounting housing 15 adjacent the planar lenses. The lenses may be totally transparent or partially transparent to emit the generated light from the internal light sources to eternal of the housing. Conventional internal wiring and the conventional circuitry is also housed within housing 15 and connected to performed the desired display functions as indicated. A lower base support 17 mounts the display to the interior surface of the vehicle adjacent the rear view window to display the illustrated materials to a driver in another vehicle which follows. Since, the lettering and numbers used are relatively large, any vehicle to the direct rear or the side may easily view what is displayed.

Figure 3:
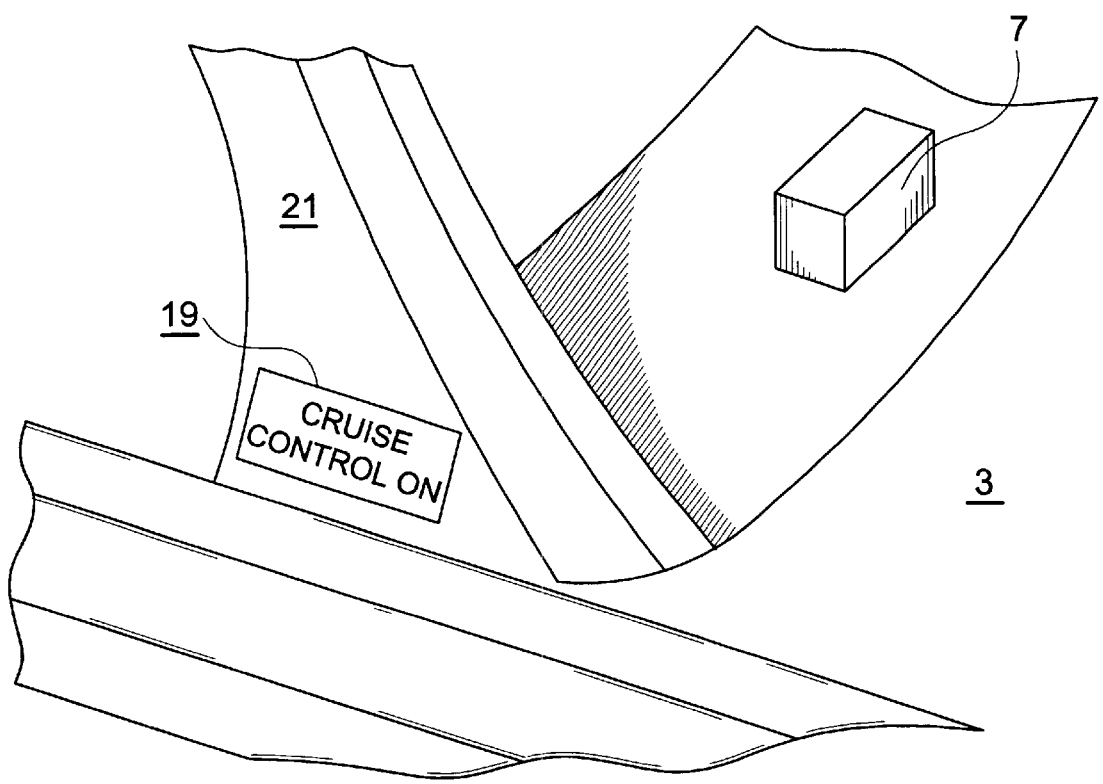
FIG. 3 is a second embodiment showing the display positioned to the rear side of the vehicle.

FIG. 3 is a second embodiment showing a slightly different display 19 positioned on and outside of the vehicle 3. partially shown. The upper rear conventional brake light is shown positioned within the glass enclosed confines of the driver/passenger compartment. In this embodiment, the display 19 is fixed to the outside of the vehicle at the left rear window pillar 21. Only the notice "CRUISE CONTROL ON" is in the display and illuminated by an internal light source that shines through the lens surface. Clearly, the speed at which the cruise control is set could also be displayed if desired. Again, the display may be operated by a switch controlled by the operated or can be wired to be automatically displayed when the cruise control is activated by the driver. More than one such display 19 could be fixed to the external surface of the vehicle as desired, for example, a similar display could be placed on the opposite side rear window pillar to warn vehicle on that side.

Figure 4:
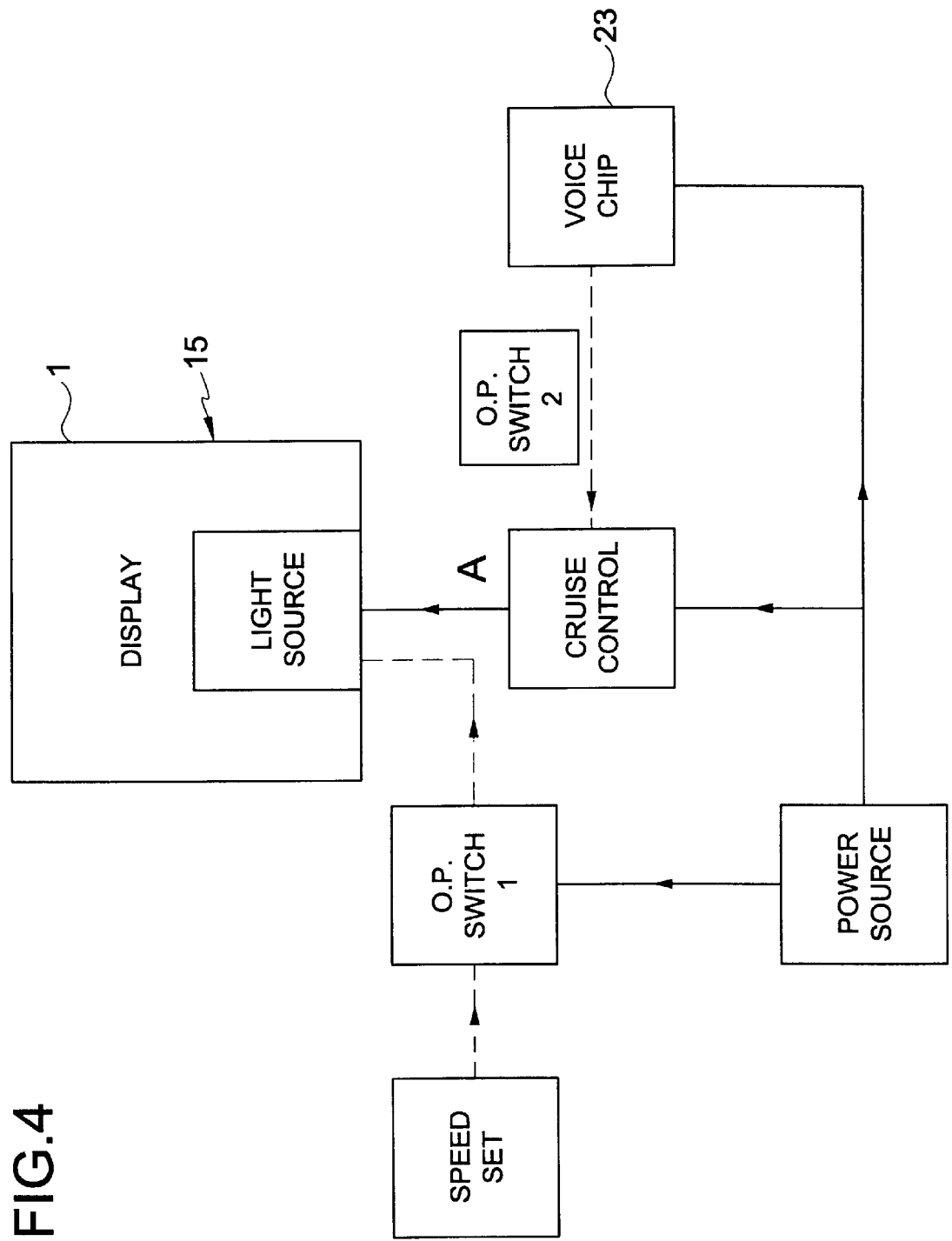
FIG. 4 is a block schematic diagram shown the interrelationship and functioning of the major system components.

FIG. 4 is a block schematic diagram shown the interrelationship and functioning of the major system components. The wire, switch and other electrical components connections to the display's light source or sources are conventional and are not detailed. The voice chip 23 is also conventional and electrically operated. It is located within the driver/passenger compartment and used to provide for audible signals when triggered by a preset speed being attained by the vehicle. When so triggered the voice alerts the driver to activate the cruise control. Words such as "you should now activate the cruise control to avoid speeding" may be used. This activation setting may be changed by the operator as desired to adjust for different speed limits along the roadway. When activated, the alert to the driver prevents the driver from inadvertently speeding.

In FIG. 4, the solid lines represent solid wire connections and automatic occurring actions that take place. The dotted line format connections represent connections that require the input of the driver or operator to be effective. For example, the vehicle electric power source, such as a battery or alternator, is labeled power source and is directly connected to the cruise control, the voice chip and a switch labeled OP. SWITCH 1 ( or operator switch). The voice chip alerts the driver to engage the cruise control when a preselected speed is attained. However, to do so the driver must throw another OP. SWITCH 2.

Similarly, while in the operator input or action mode, the operator must set the cruise control speed and then input a signal to the light source which displays the notice that the cruise control is on and the specific speed at which set. In the fully automatic mode when no driver action is required to display the notice or the speed at which the cruise control is set. When in the solid line or automatic mode, power is supplied to the conventional cruise control which when activated and engaged sends a signal A to the light source to display the notice that the cruise control is on and the specific speed at which it is set. The voice chip is active in both the operator action required mode and the automatic mode. In the operator action required mode, the operator must both set and engage the cruise control and then take action to display the notice and speed the display settings. In the fully automatic mode, the voice chip alerts the driver or operator to set and engage the cruise control which action then automatically results in the notice and set speed being displayed. Normally, only one of the two described modes is used at a given time. In the operator mode, the display could have its illuminating power supplied from the vehicle's electrical power source or could be a battery operated self contained power source within the confines of the housing 15 shown in FIG. 2 without an external wire connections.

When the notice that the cruise control is on is displayed on the first vehicle, other drivers in a second or third vehicle are alerted to take action to follow or pass the first vehicle. Also, in the event the first vehicle with the activated cruise control and display system were to speed up or slow down slightly, the occupants of other (second, third, etc.) vehicles would know that such action was not the particular driver's fault but due to the engage cruise control. This notice would hopefully prevent agitation and so called "road rage" incidence.

The illuminated display 1 could be placed in the rear window as in the FIGS. 1–2 embodiments, the outside of the vehicle as in the FIG. 3 embodiment, or at different locations on or in the first vehicle as desired. An adhesive backing on the vehicle engaged surface of the display would permit such outside mountings. The important objective is that the display is clearly visible to other drivers in second, third, etc. vehicle.

Most of the described sub components are conventional and off the self items. Included in this list are the cruise control system of the vehicle, the voice chip, the lenses 11 and 13, the switches and other wires and electronic and electrical components necessary to effectuate the desired results. The assembled system could either be an OEM (original equipment manufacturer) supplied item or could an after market add on item which is retrofitted on a vehicle. Variations as to the particular voice chip used and the specific cruise control system employed is also contemplated. LEDs (light emitting diodes) can be used for the displayed letters and numbers in the readout display 1 which can be changed either by the operator or automatically changed depending on the speed at which the cruise control is operating.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

We claim:

1. A cruise control alert system for a vehicle comprising:
   a first vehicle having a cruise control system for maintaining the vehicle at a set speed;
   a visual display mounted to said first vehicle to indicate to occupants of a second vehicle that the cruise control is activated; and
   a voice chip mounted on said first vehicle to alert the operator to set the cruise control system at a preselected speed.

2. The cruise control alert system as claimed in claim 1, wherein said visual display is illuminated by an internal electrically operated light source, said display having indicia to indicate a notice that the cruise control is operating and the specific speed at which the cruise control is set.

3. The cruise control alert systems claimed in claim 2, wherein
   said voice chip is internal of said first vehicle and after alerting the operator operator to set the cruise control system, requires action to actuate the cruise control system to set the operative speed of the first vehicle.

4. The cruise control alert system as claimed in claim 3, wherein said visual display is mounted within the first vehicle adjacent a rear window of the first vehicle.

5. The cruise control alert system as claimed in claim 3, wherein said visual display is mounted outside of and on said first vehicle, said visual display being electrically connected to an internal power source of the first vehicle.

* * * * *